United States Patent [19]

Smulders

[11] Patent Number: 5,679,900
[45] Date of Patent: Oct. 21, 1997

[54] ENVELOPE ENHANCEMENT SYSTEM FOR DETECTING PAPER MACHINE PRESS SECTION ANOMALOUS VIBRATION MEASUREMENTS

[75] Inventor: Adrianus Josephus Smulders, San Diego, Calif.

[73] Assignee: SKF Condition Monitoring, San Diego, Calif.

[21] Appl. No.: 421,469

[22] Filed: Apr. 12, 1995

Related U.S. Application Data

[63] Continuation of Ser. No. 987,050, Dec. 8, 1992, abandoned.
[51] Int. Cl.$^6$ .......................... G01M 13/02; G01M 13/04
[52] U.S. Cl. .......................... 73/659; 73/660; 73/593; 162/262; 364/508; 364/551.06
[58] Field of Search .......................... 73/660, 661, 659, 73/587, 593, 159; 340/683; 162/262, 263, 358.1; 364/506, 508, 550, 551.06

[56] References Cited

U.S. PATENT DOCUMENTS

| | | | |
|---|---|---|---|
| 2,760,369 | 8/1956 | Vanator | 73/67 |
| 3,393,557 | 7/1968 | Brown et al. | 73/116 |
| 3,641,550 | 2/1972 | Lynas et al. | 340/261 |
| 3,699,806 | 10/1972 | Weichbrodt | 73/659 |
| 3,842,663 | 10/1974 | Harting et al. | 73/659 |
| 3,971,249 | 7/1976 | Bachofer | 73/67 |
| 4,007,630 | 2/1977 | Noda | 73/659 |
| 4,322,976 | 4/1982 | Sisson et al. | 73/659 |
| 4,425,798 | 1/1984 | Nagai et al. | 73/659 |
| 4,493,042 | 1/1985 | Shima et al. | 73/593 |
| 4,550,604 | 11/1985 | Sugimoto et al. | 73/659 |
| 4,758,964 | 7/1988 | Bittner et al. | 364/508 |
| 4,768,380 | 9/1988 | Vermeiren et al. | 73/593 |
| 4,884,449 | 12/1989 | Nishimoto et al. | 73/660 |
| 4,902,384 | 2/1990 | Antotz et al. | 162/262 |
| 4,931,949 | 6/1990 | Hernandez et al. | 73/660 |
| 4,988,979 | 1/1991 | Sasaki et al. | 73/660 |
| 5,511,422 | 4/1996 | Hernandez | 73/660 |

FOREIGN PATENT DOCUMENTS 1603190  11/1981  United Kingdom .

OTHER PUBLICATIONS

Patent Abstracts of Japan, vol. 17, No. 357 (P-1568) 6 Jul. 1993 & JP,A,05 052 644 (Ono Sokki Co. Ltd) 2 Mar. 1993.
Ronald L. Eshleman, Ph.D., P.E., Vibration Institute, Analysis of Rolls, Presses, and Calenders, Nov. 12–15, 1991.
Eric Huston, Application Engineer Machine Monitoring Systems, Measurex Systems, Inc., Paper Machine Press Section Vibration.
Kenneth A. Walker, Manager of Analytical Services, Wagner Sytems, Inc., Vibration Analysis Techniques for Paper Machine Press Sections, Nov. 1991.
Greg Radney, Improving Paper Machine Runnability With Sensodec–10, Reprinted from 1989 Annual Meeting, Feb. 1989, Copyright, TAPPI, Technology Park/Atlanta, GA 30348, 1989.
Lee Vanrooy, Mead Paper, Escanaba, MI, and Ginger Elston, Miami University, Oxford, OH, Improve Paper Machine Performance Using On–Line Vibration Analysis, Paper presented at the 75th Annual Meeting of the Technical Section, CPPA, Montreal, Quebec, Jan. 31–Feb. 3, 1989.

*Primary Examiner*—Hezron E. Williams
*Assistant Examiner*—Helen C. Kwok

[57] ABSTRACT

A vibration detecting and condition monitoring system for the press section, including felts, rollers and presses, employing a feature extracting circuit having a selectable plurality of Bessel type bandpass filters and an enveloping circuit to square the bandpassed signal output prior to FFT analysis of the signal. The system enables the enhancement and detection of highly impulsive signals in the frequency domain, that are indicative of defects in machinery operation.

21 Claims, 1 Drawing Sheet

ENVELOPE ENHANCEMENT SYSTEM FOR DETECTING PAPER MACHINE PRESS SECTION ANOMALOUS VIBRATION MEASUREMENTS

This application is a continuation of application Ser. No. 07/987,050, filed Dec. 8, 1992, now abandoned.

BACKGROUND OF THE INVENTION

This invention relates to a quality control and fault monitoring system for use in paper machine press sections, including felts, rolls and presses.

In the prior art, techniques to detect vibrations have been found to be lacking in some important areas. One such area is the detection of defects occurring over a short period of time (eg., an impulsive defect). The present invention allows for the rapid and efficient detection of such impulsive defects.

By way of example, some prior devices detect anomalous vibrations in machinery by employing a technique known as synchronous time averaging, as explained in the 1965 technical paper by Charles R. Trimble, "What is Special Averaging", Hewlett-Packard Technical Paper 1965. Briefly, and in general terms, in synchronous averaging a point on a rotating piece of machinery, such as a power shaft, is marked with a trigger, such as reflective tape or a grease spot on the shaft, and a photo-tachometer is used to monitor the actual displacement of the rotating machinery, be it angular displacement or linear displacement. Keyphasers, velocity transducers or accelerometers may also be employed in this task. A series of measurements of the rotating machinery is taken over time, averaged and analyzed by an analyzer, which is often a digital computer. The trigger is used as a reference point in time in the analysis. The analyzer collects data over one periodic cycle of the machinery, and repeats the data collection over a series of such periodic cycles. In the event a synchronous defect is present, such as a flat spot in a roll or a felt related anomaly, the defect will appear at the same point in time from the trigger. Non-synchronous defects or events occur randomly with respect to the triggering pulse. The idea behind synchronous averaging is that by repeated measurements with an analyzer, a defect will manifest itself over time as a irregularity in the data collected by the analyzer.

While synchronous time averaging appears to be an ideal system for detecting defects in theory, in practice several factors are responsible for mitigating its effectiveness. For one thing, synchronous averaging appears to be better suited to detecting low frequency defect signals, such as stationary sinusoidal vibrations due to imbalance and misalignment of shafts. Typically these vibration signals are very low frequency signals. Because the sensitivity limits of transducers can be reached at these very low frequencies, for synchronous detection to work best a very long time interval for sampling the machinery is often required. Also, if data from synchronous defect detection is in the time domain rather than in the frequency domain, it is sometimes difficult to detect highly impulsive defects, such as those vibrations induced by a roll or press anomaly or a felt problem, which may not and often do not coincide with the longer periodic vibrations present in a rotating machinery. These impulsive defects often produce impulse signals containing high frequency sinusoidals, rather than only lower frequency sinusoids of stationary vibration defect signals. The repetitive frequencies of these phenomena (the beat) can be very low.

Finally, if no signal enhancement of impulse signals having high frequency components is performed, such as by enveloping, there is a significant risk that a transducer signal will be masked by background structural machine noise, which is always present and can be present over all frequencies. Although a defective felt press roll or bearing can transmit a significant force through the bearing housing, the response of the supporting structure is usually very small (as measured by an accelerometer mounted near the bearing load zone), and, as a consequence, the detection of the defect runs the risk of being masked by noise, especially if measured in the frequency domain.

In rotating machinery enveloping is most significant on repetitive roller defects of the impact type, especially low-force impacts, and less important on vibrations due to non-impact defects, such as misalignment.

Synchronous time averaging for very slow speeds has the further disadvantage that due to the long sampling time required for measurement, the speed variations in the machinery being measured, such as are common in paper machines, will adversely influence the result of the averaging process. As the enveloping techniques of the present invention have inherent real time averaging capabilities present in it, consequently the sampling time does not have to be as long due to the enveloping process, as explained more fully below.

SUMMARY OF THE INVENTION

The present invention is directed to providing for the detection of defects in vibrating or rotating machinery, including but not limited to vibrations caused by misalignments, broken parts, pitted or flat spots in rollers and loose tolerances, to enhance the quality control of the machinery, as well as to predict the possible failure of the machinery.

The present invention employs a novel configuration of hardware not previously found in paper machines in the past. The present invention has been designed for use with paper machine press monitoring, with the intention of indicating whether the felts that handle the paper are anomalous, which damage the paper flow and the quality of the paper product. The present invention has also been used to monitor press rolls. The present invention also has more general applications, to include all types of condition monitoring on rotating and vibrating machinery. For example, another application of equivalent nature can be found in the quality control of roller mills in steel plants.

The present invention is capable of detecting anomalous vibrations that may be highly impulsive and contain high frequency sinusoidal components.

The present invention is capable of detecting anomalous vibrations in a short period of time, without requiring the storing and analyzing of extensive data over a long sampling history. Hence, the present invention may be suitable for real time analysis.

The present invention is capable of the enhancement of small signals sensed by a transducer, such as an accelerometer, as well as the mapping of such a signal from the time domain to the frequency domain, to better overcome the tendency of such signals to be lost in noise.

The present invention achieves this result by employing a novel configuration that samples vibration signals with an accelerometer, employs selectable band pass filters to filter these signals, uses small signal enhancement techniques such as envelope detection to further shape and enhance these signals, and maps these vibration signals to the frequency domain using Fast Fourier Transform (FFT) spectrum analysis. In lieu of the frequency domain the averaged signals could be displayed in the time domain.

Other features and advantages of the present invention will become apparent from the following detailed description, taken in conjunction with the accompanying drawings, which illustrate, by way of example, the principles of the invention.

DESCRIPTION OF THE PREFERRED EMBODIMENT

Figure 1:
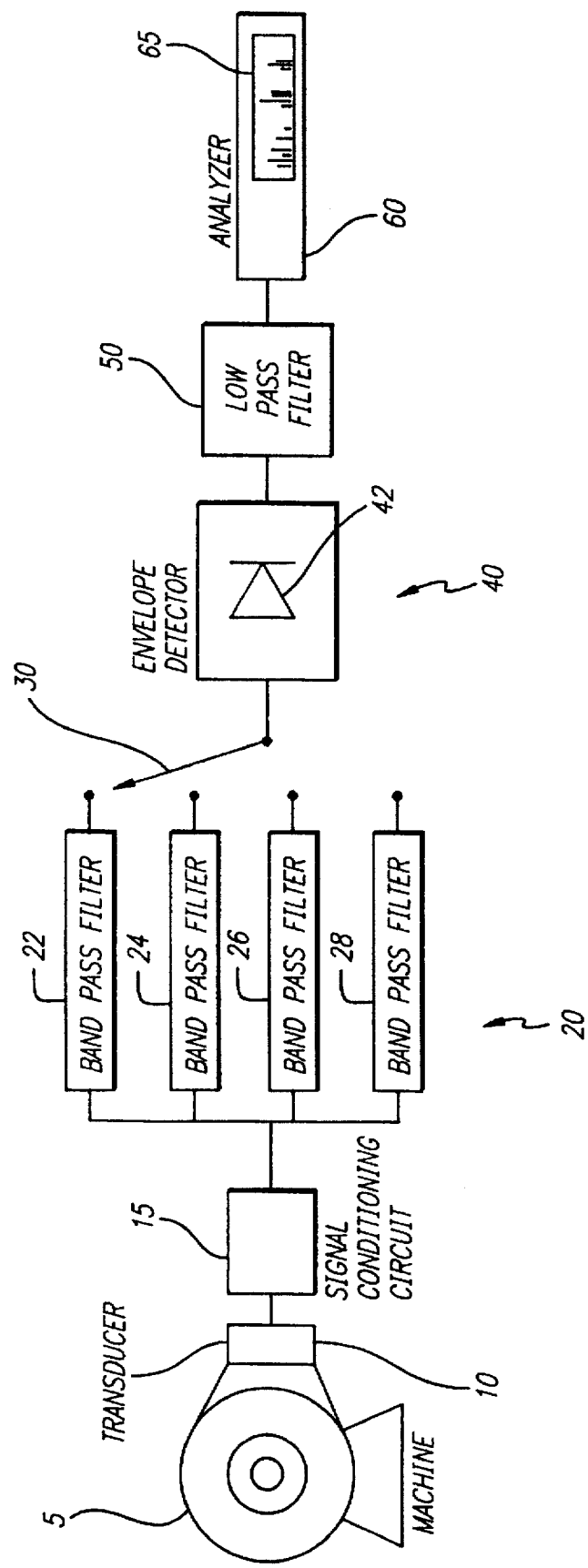
FIG. 1 is a circuit block diagram of the present invention.

The present invention employs three stages for condition monitoring of a machine: a sensing stage comprising transducer 10 and signal conditioning circuit 15, a feature extracting stage comprising band pass filters 20, enveloping detector circuit 40, and low pass filter 50, and a final analysis stage comprising Fast Fourier Transform (FFT) spectral analyzer 60.

FIG. 1 shows a circuit block diagram of the present invention. A vibration detecting transducer 10, such as an accelerometer, picks up vibration signals from machinery 5 and transmits these signals to a selectable band pass filter 20. The transducer is connected to the machine in the manner known in the art to produce optimal pickup of signals, such as for example mounting the transducer so that no air gaps are interspaced between it and the machine, sufficient contact is generated with the machine, and the proper sensor sensitivity for optimal signal to noise ratio is achieved, which is in the range of 10 to 500 mv/G, and generally centered around 50-100 mv/G, based on the application.

The transducer output signal is applied to a signal conditioning circuit 15 to scale the output of the transducer so that it lies within the voltage range required for compatibility with the rest of the circuits in the system.

Band pass filter 20 is set to reject relatively low frequency signals and pass relatively higher frequency signals, and is selectable in the range of signal frequencies it may pass by a switch 30. As is known per se in the art, band pass filters attenuate frequencies outside the passband. The frequency range may be user selectable according to the criteria of the speed range of the machinery being analyzed and/or the analyzing range of the system. The filter criteria selection is based on suitable rejection of the low frequency sinusoids while optimizing the passband of the defect harmonics. In the preferred embodiment four such band pass filters are employed, filters 22, 24, 26 and 28, having pass band frequencies of 0.5-10 Hz, 5-100 Hz, 50-1,000 Hz, and 500-10,000 Hz.

The particular filter selected by the user may be selected according to the frequency band desired, the speed range of the machinery, or the analyzing range, as shown on the following table. The frequency band is the frequency of the signal in the time domain, the speed range is the speed of a rotating machinery sampled and the analyzing range is the frequency of the spectral analyzer used to display the output.

| FREQUENCY BAND | SPEED RANGE | ANALYZING RANGE |
| --- | --- | --- |
| 0.5-10 Hz | 0-5 RPM | 0-1 Hz |
| 5-100 Hz | 0-50 RPM | 0-10 Hz |
| 50-1,000 Hz | 25-500 RPM | 0-100 Hz |
| 500-10,000 Hz | 250-5,000 RPM | 0-1,000 Hz |

The user selectable bandpass filter may also be set to any empirically determined frequency band that has been found to optimize the transducer signal to noise ratio, and to match structural or transducer resonance.

In the preferred embodiment band pass filter 20 is of the Bessel type, in order to minimize phase distortion of the signal.

After a vibration signal passes through selectable band pass filter 20, it is conditioned by envelope detector 40. Envelope detector 40 enhances high frequency components of impulsive signals, such as of the kind often produced by in defects in machinery, by employing signal enhancement techniques such as enveloping the band passed signal with a circuit that approximately squares the signal. Signal enhancement is important when mapping a highly impulsive signal into the frequency domain, to help augment the signal and distinguish it from noise.

More particularly, the present invention employs envelope detector 40 to detect and amplify high frequency signals. This is achieved with a circuit that approximately squares the signal. In the simplest embodiment, this can be done by a peak detector or rectifier using a diode 42. Other known techniques for squaring the band passed signal may be employed.

In this way the high frequency harmonic amplitudes, of the kind most likely to be found in an impulsive signal, are enhanced and made to better stand out from normal vibration signals. In a sense the feature extracting stage of the present invention widens out the sensed signals and performs a kind of instantaneous averaging, eliminating the necessity of long sampling times as might occur under synchronous time averaging.

To illustrate the importance of the feature extracting stage of the present invention, consider the case where a periodic defect signals is present, that can be represented in a Fourier Series as:

$$f(x)=1/2A_0+\Sigma[A_n\cos(n\omega_0 x)+B_n\sin(n\omega_0 x)]$$

where $\omega_0 2\pi/T$, T=the period of the defect, and $$A_n=(2/T)\int f(x)\cos(n\omega_0 x)dx$$

and $$B_n=(2/T)\int f(x)\sin(n\omega_0 x)dx$$

for n=0,1,2, . . .

and the coefficients $A_n$ and $B_n$ are the Fourier Coefficients, with the integrals taken over the period of the function.

Thus, as is well known per se, any periodic function can be formed out of a sum of sine and cosine functions that contain integral n multiples of the periodic function frequency (eg., harmonics).

If the function is squared, eg., f(x) * f(x), when the Fourier Series is expanded there become apparent terms such as (sin α)(sin β) which can be reduced to a series of sums and differences using the trigonometric equation:

$$(\sin \alpha)(\sin \beta)=\tfrac{1}{2}\cos(\alpha-\beta)-\tfrac{1}{2}\cos(\alpha+\beta).$$

Hence if a function f(x), representing a transducer output, is filtered to pass only the higher orders of frequencies (which would more likely be the defect indicating frequencies), say, by way of example, frequencies greater than the 50th harmonic, and if this filtered function is squared, we would obtain:

$$f(x) * f(x)=[\sin(51x)+\sin(52x)+\ldots \sin(100x)]^2=\sin(51x)\sin(51x)+\\ 2\sin(51x)\sin(52x)+\ldots +2\sin(51x)\sin(100x)+2\sin(52x)\sin(100x)$$

Using the above trigonometric equation, the components such as sin(51x) sin(52x) can be broken down into sum and difference components (α±β), such as, by way of example, 52−51 and 52+51, to give:

½cos(1x)−½ cos(103x), etc.

In the present invention only the difference components, such as 1x in the above example, rather than the mum components, such as 103x, would be saved, as only these difference component signals would be within the analysis measurement range of interest. The higher frequency sum component signals could be filtered out from the desired difference component signals with a low pass filter 50 prior to analysis by spectrum analyzer 60.

Thus, according to the above example, the bandpassed signals from transducer 10, after passing through envelope detector 40 but prior to the signals passing through low pass filter 50, would contain difference component harmonics such as the vectorial sum of harmonics comprising the (52nd−51st)+(53rd−52nd)+(54th−53rd)+. . .(100th−99th) harmonics, that, as these components are summed, would appear as a large 1x difference component signal that can be normally processed by the Fast Fourier Transform (FFT) spectrum analyzer 60. In general, for all the harmonic components spaced by spaced by n harmonics apart, a series of n*x difference component signals from any defect vibration would be produced, with each these components, 1X, 2X, 3X, . . . etc, appearing on a Fast Fourier Transform (FFT) spectral amplitude analyzer as peaks spaced at 1X, 2X, 3X, . . . etc. of the frequency of the defect.

Hence a vibrating signal having a frequency $f_a$ in the time domain (which could be a normal vibration signal, or a defective vibration such as the result of a flat spot on a rotating roll), would appear in the amplitude spectrum plot over the frequency domain as phaser(s) located at a n*times the frequency $f_a$, as indicating in window 65 of analyzer 60.

Thus a defect indicating signal processed by the present invention produces such peaks that stand out in a more prominent manner in a spectral analyzer than would a similar signal not so processed.

In analyzer 60 the conditioned and band passed filtered vibration signals from the time domain are mapped to the frequency domain, preferably using the techniques of Fast Fourier Transform (FFT) analysis, as is known per se in the art of signal processing. In general, any type of signal transform may be employed. Indeed, even an analyzer in the time domain, such as an oscilloscope, may be employed. However, by utilizing the frequency domain of a signal rather than its time domain, and by augmenting and conditioning highly impulsive signals that are frequently characteristic of signals indicating defective vibrations, the robustness of a vibrating machinery can be more readily ascertained.

A processor may be employed as part of analyzer 60 to ascertain the nature of a vibration signal, such as whether it is normal or abnormal, or whether it is impulsive, sinusoidal, Gaussian, some combination thereof or representative of any other known signal. In this way the processor may be used to store data to make predictions about the likelihood of future failure of the machinery, based on the signals generated by the same machine or similar classes of machines in the past. Furthermore, the data generated by the present invention may be used to pinpoint likely sources of vibration, and to take appropriate remedies in the event the vibrations indicate defective modes of operation of the machinery. Thus the present invention may be used as not only a system for failure analysis in a machine but also as a system for quality control of the machine.

Though the present invention employs in the preferred embodiment relatively simple implementations for enhancement of signals, one skilled in the art could implement more complex implementations using the teachings of the present invention, such as synchronous demodulation or digital demodulation. Examples of such signal enhancing techniques may be found in U.S. Pat. No. 4,768,380, incorporated herein in its entirety.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. In a paper machine felt press section, a fault detection system, comprising:

a sensor to sense signals representative of vibrations from said press;

a feature extracting circuit having at least one band pass filter for receiving said signals and for separating and passing a limited predetermined range of harmonic frequencies from a small amplitude impulse perturbation in said signals indicative of a selected fault in said press, and an enveloping circuit to substantially square said signals passed by said band pass filter to enhance said small amplitude impulse perturbation; and an analyzer for receiving said signals from said enveloping circuit and indicating said selected fault in said press.

2. The fault detection system according to claim 1, wherein said analyzer displays a plot of said signals from said enveloping circuit in the frequency domain.

3. The fault detection system according to claim 2, wherein said enveloping circuit comprises a rectifier, and said analyzer is a FFT spectral analyzer.

4. The fault detection system according to claim 2, wherein said band pass filter is a Bessel filter.

5. The fault detection system according to claim 2, wherein said feature extracting circuit has a plurality of band pass filters, each having a different frequency passband, and said band pass filters are operably selectable to receive said signals from said sensor for separating and passing different predetermined ranges of harmonic frequencies indicative of different faults in said press section.

6. The fault detection system according to claim 5, wherein said filters are operably selectable by a switch, and said plurality of filters equals at least four filters, said four filters passing signals in the range of between 0.5 Hz to 10 kHz.

7. The fault detection system according to claim 1, wherein said analyzer is an oscilloscope that displays a plot of said signals received from said enveloping circuit in the time domain.

8. A method for detecting faults in paper machine press sections, comprising:

sensing vibrations in a press section of a paper machine;

producing a signal representative of said sensed vibrations;

filtering said signal to separate a predetermined range of harmonics from a small amplitude repetitive impulse perturbation therein indicative of a selected fault in said press section from other low frequency components in said signal; and analyzing said impulse perturbation to determine the nature of said fault in said press section.

9. Method as set forth in claim 8, wherein said step of filtering said signal comprises envelope enhancement.

10. Method as set forth in claim 8, wherein said step of filtering comprises:
band pass filtering said signal to reject said low frequency components from said signal and to separate and pass said predetermined range of harmonics;
enveloping said band pass filtered signal to enhance said harmonics contained therein; and
low pass filtering said enveloped signal to reject high frequency components resulting from said enveloping from said signal.

11. Method as set forth in claim 8, wherein said step of analyzing said impulse perturbation comprises converting said signal to the frequency domain and detecting harmonic components therein.

12. Method as set forth in claim 8, wherein said fault comprises felt defects.

13. Method as set forth in claim 8, wherein said fault comprises roller defects.

14. The method as set forth in claim 8, wherein said step of filtering said signal comprises selecting a band pass filter from a plurality of band pass filters, each having a different frequency passband indicative of a different fault in said press section, and filtering said signal through said selected band pass filter to separate and pass a predetermined range of harmonics indicative of the fault corresponding to said selected band pass filter.

15. Apparatus for detecting faults in a paper machine press section, comprising:
means for sensing vibrations in the press section of a paper machine;
means for producing a signal representative of said sensed vibrations;
means for filtering said signal to separate a train of harmonics of small amplitude repetitive impulse perturbations in a selected frequency range indicative of a selected fault in said press section and to distinguish said perturbations from other low frequency components of said signal; and
means for analyzing said impulse perturbations to determine the nature of said fault in said press section.

16. Apparatus for detecting faults in a paper machine press section, comprising:
a vibration transducer for sensing vibrations in a press section of a paper machine and producing an electrical signal representative of said vibrations;
a feature extracting circuit for separating small amplitude repetitive impulse perturbations in a selected frequency range indicative of a selected fault in said press section from other low frequency components of said electrical signal; and
an analyzer for analyzing said impulse perturbations to determine the nature of said fault in said press section.

17. Apparatus as set forth in claim 16, wherein said feature extracting circuit comprises:
a band pass filter for receiving said signal and for separating and passing a predetermined range of harmonic frequencies of said impulse perturbations;
an enveloping circuit for enveloping the signal from said band pass filter to enhance said repetitive impulse perturbations; and
a low pass filter for removing high frequency components from said signal resulting from said enveloping circuit.

18. In a paper machine felt press section, a fault detection system, comprising:
a sensor to sense signals representative of vibrations from said press;
a feature extracting circuit having at least one band pass filter for receiving said signals and for separating and passing a predetermined range of harmonic frequencies from a small amplitude impulse perturbation in said signals indicative of a selected fault in said press, and an enveloping circuit to substantially square said signals passed by said band pass filter to enhance said small amplitude impulse perturbation; and
an analyzer for receiving said signals from said enveloping circuit and indicating said selected fault in said press based upon said range of harmonic frequencies passed by said band pass filter indicative of said selected fault in said press.

19. A method for detecting faults in paper machine press sections, comprising:
sensing vibrations in a press section of a paper machine;
producing a signal representative of said sensed vibrations;
filtering said signal to separate a plurality of harmonics of small amplitude repetitive impulse perturbations therein in a selected frequency range indicative of a selected fault in said press section from other low frequency components in said signal; and
analyzing said impulse perturbations to determine the nature of said fault in said press section based upon said plurality of harmonics of small amplitude repetitive impulse perturbations in said selected frequency range of said filtered signal indicative of said selected fault in said press.

20. Apparatus for detecting faults in a paper machine press section, comprising:
means for sensing vibrations in the press section of a paper machine;
means for producing a signal representative of said sensed vibrations;
means for filtering said signal to separate a plurality of harmonics of small amplitude repetitive impulse perturbations in a selected frequency range indicative of a selected fault in said press section from other low frequency components of said signal; and
means for analyzing said impulse perturbations to determine the nature of said fault in said press section based upon said plurality of harmonics of small amplitude repetitive impulse perturbations in said selected frequency range indicative of said selected fault in said press section.

21. Apparatus for detecting faults in a paper machine press section, comprising:
a vibration transducer for sensing vibrations in a press section of a paper machine and producing an electrical signal representative of said vibrations;
a feature extracting circuit for separating a plurality of harmonics of small amplitude repetitive impulse perturbations in a selected frequency range indicative of a selected fault in said press section from other low frequency components of said electrical signal; and
an analyzer for analyzing said impulse perturbations to determine the nature of said fault in said paper machine press section based upon said plurality of harmonics of small amplitude repetitive impulse perturbations in said selected frequency range indicative of said selected fault in said press section.

* * * * *

UNITED STATES PATENT AND TRADEMARK OFFICE
CERTIFICATE OF CORRECTION

PATENT NO. : 5,679,900
DATED : Oct. 21, 1997
INVENTOR(S) : Adrianus Josephus Smulders It is certified that error appears in the above-identified patent and that said Letters Patent is hereby corrected as shown below:

Column 6, Claim 4, Line 38, change "2", to read --1--.

Column 6, Claim 6, Line 48, after "said", add --band pass--.

Column 6, Claim 6, Line 49, after "of", add --band pass--.

Signed and Sealed this

Third Day of March, 1998

Attest:

BRUCE LEHMAN

Attesting Officer

Commissioner of Patents and Trademarks